United States Patent [19]
Hilde

[11] Patent Number: 5,692,862
[45] Date of Patent: Dec. 2, 1997

[54] KNOCK DOWN CARGO GUIDE RAIL

[75] Inventor: Ronald L. Hilde, Arlington, Wash.

[73] Assignee: The Boeing Company, Seattle, Wash.

[21] Appl. No.: 672,195

[22] Filed: Jun. 27, 1996

[51] Int. Cl.$^6$ .................................................. B60P 7/13
[52] U.S. Cl. .................................. 410/69; 410/77; 410/80
[58] Field of Search ............................. 410/69, 77, 78, 410/80, 94; 244/118.1, 137.1; 248/500, 503

[56] References Cited

U.S. PATENT DOCUMENTS

| | | | |
|---|---|---|---|
| 3,741,508 | 6/1973 | Alberti | 410/69 |
| 4,388,030 | 6/1983 | Skaale | 410/69 |
| 4,696,609 | 9/1987 | Cole | 410/69 |
| 5,011,348 | 4/1991 | Jensen et al. | 410/69 X |
| 5,265,991 | 11/1993 | Herrick et al. | 410/69 |
| 5,310,297 | 5/1994 | Benjamin | 410/77 |
| 5,486,077 | 1/1996 | Nutting | 410/69 |

*Primary Examiner*—Stephen Gordon
*Attorney, Agent, or Firm*—Thomas W. Hennen

[57] ABSTRACT

A guide rail and support assembly for use in an aircraft cargo compartment for guiding cargo containers being transported by the aircraft cargo container transportation system uses a four bar mechanism to allow the guide rail to be lowered to accommodate wide cargo containers. The assembly lowers or retracts in response to being accidentally struck endwise by a cargo container, thereby avoiding damage to the cargo deck surface. The guide rail and support assembly uses a detent mechanism to prevent nuisance retractions while reliably retracting in response to endwise impact by a cargo container. The guide rail and support assembly is easily lowered manually when necessary to accommodate wider cargo containers, and is easily reset to the extended or upright position manually.

7 Claims, 6 Drawing Sheets

KNOCK DOWN CARGO GUIDE RAIL

BACKGROUND OF THE INVENTION

1. Field of the Invention

This invention pertains to a component of a materials handling system based on a four bar mechanism. With greater particularly, this invention pertains to an apparatus for guiding cargo containers as they move along a surface. With greatest particularity, this invention pertains to a retractable cargo container guide rail and mounting base system for use in an aircraft cargo compartment.

2. Background Information

One of the challenges confronting operators of freighter aircraft is efficiently handling cargo to be transported by the aircraft. Early freighters used manual labor to load and unload cargo. The loading and unloading operation has been improved dramatically by using large cargo containers designed to fit within the space limitations of an aircraft cargo compartment. Many items of freight headed for a single destination are loaded into a single container and then transported to the aircraft as a single unit rather than being transported as individual items of freight.

Aircraft cargo handling systems have been developed to move these cargo containers once they have been transported to the aircraft. For example, the cargo compartment deck surface may be equipped with ball bearing rollers to facilitate flight line workers moving pallets and containers resting on the rollers across the cargo deck surface manually. Some aircraft are equipped with powered mechanisms having friction rollers that provide the force to move the loaded cargo containers from the cargo compartment door to the place in the cargo compartment where they will be secured for the duration of the flight.

These powered cargo container handling systems require some means of guiding the heavy cargo containers to their proper destination in the cargo compartment, while preventing them from stalking the sidewalls of the aircraft and possibly doing structural damage as they are being loaded or unloaded. Usually a system of stops serves to guide cargo containers and prevent them from striking aircraft side wall structure.

Because aircraft fuselages are not always the same width from the front of the cargo compartment to the rear, or because some cargo spaces in aircraft cargo compartments occupy less than the entire width of the aircraft, some cargo containers are wider than others. For a single cargo loading and unloading system to accommodate all widths of cargo containers, more than one set of cargo container guide stops may be required in the same area of the cargo compartment. Cargo containers of different widths would usually be loaded in batches of a particular width until the area of the cargo compartment intended for receiving such cargo containers was full. When wide cargo containers are being loaded, the guide stops intended to accommodate narrower cargo containers would be retracted into the cargo deck surface or removed so as not to interfere with passage of wider containers.

If a guide stop for narrow containers is inadvertently left in place, it is in danger of being struck by a heavily loaded cargo container when the loading operation switches to the wider containers. When struck directly by a fully loaded cargo container weighing several thousand pounds, and especially if propelled by a powered roller system, these stops themselves can be damaged, but more importantly, can transmit the impact force to the cargo deck surface to which they are attached, damaging it as well.

Air cargo operators need a means of guiding such cargo containers that will reliably guide the containers to their proper locations in the cargo compartment, but that will not transmit damaging forces to the cargo deck surface if accidentally struck directly by a heavy cargo container. This requirement has been satisfied by the present invention that provides reliable cargo container guidance while selectively collapsing to avoid transmitting impact forces from an errant cargo container.

SUMMARY OF THE INVENTION

The present invention provides a strong guide rail for guiding the side of a cargo container and resisting lateral impacts to keep the container aligned in the proper direction, and for preventing the container from stalking the aircraft sidewall during loading and unloading operations. At the same time the guide rail is mounted by a plurality of support members, each capable of responding to longitudinal impact on the guide rail end by yielding in a controlled manner to the longitudinal force and retracting to a position where the guide rail is no longer in the path of wide cargo containers, to thereby protect cargo deck surface structure to which the support members are rigidly attached. The guide rail and support assembly is also easily reset to an upright or extended position manually so that the loading or unloading operation may continue without interruption. The present invention incorporates what is in effect a "mechanically smart" mechanical fuse which provides strength to resist frictional and impact forces of glancing cargo containers against the face of the guide rail, but that yields in response to large magnitude longitudinal impacts that might otherwise damage cargo compartment deck surface structure.

A feature of the support members that facilitates the selective yielding and reset capabilities is a detent operable between a base portion and an arm portion of each support member that releases in response to a predetermined force magnitude and direction, and is easily reset manually. Such support members may be designed for release at a load of approximately 25 pounds force per support member, or 75 pounds for a guide rail and support assembly having three support members. The support member is designed to yield in either direction parallel with guide rail 13.

Accordingly, one object of this invention is to guide cargo containers along a preferred path across a cargo deck surface and prevent them from impacting the aircraft cargo compartment sidewall. Another object of the invention is to yield to damaging impact forces directed along the preferred path of cargo container movement that otherwise might be transmitted through the invention to the cargo deck surface structure. Yet another object of this invention is to provide such guiding and yielding structure having an easy manual reset capability so that yielded guide rails may be manually reset after being accidentally struck by a cargo container, for further operations.

BRIEF DESCRIPTION OF THE DRAWING

Other objects and advantages of this invention will become apparent after carefully studying the Detailed Description of the Preferred Embodiment and the appended claims in conjunction with the following drawing figures, wherein:

DESCRIPTION OF THE PREFERRED EMBODIMENT(S)

Figure 1:
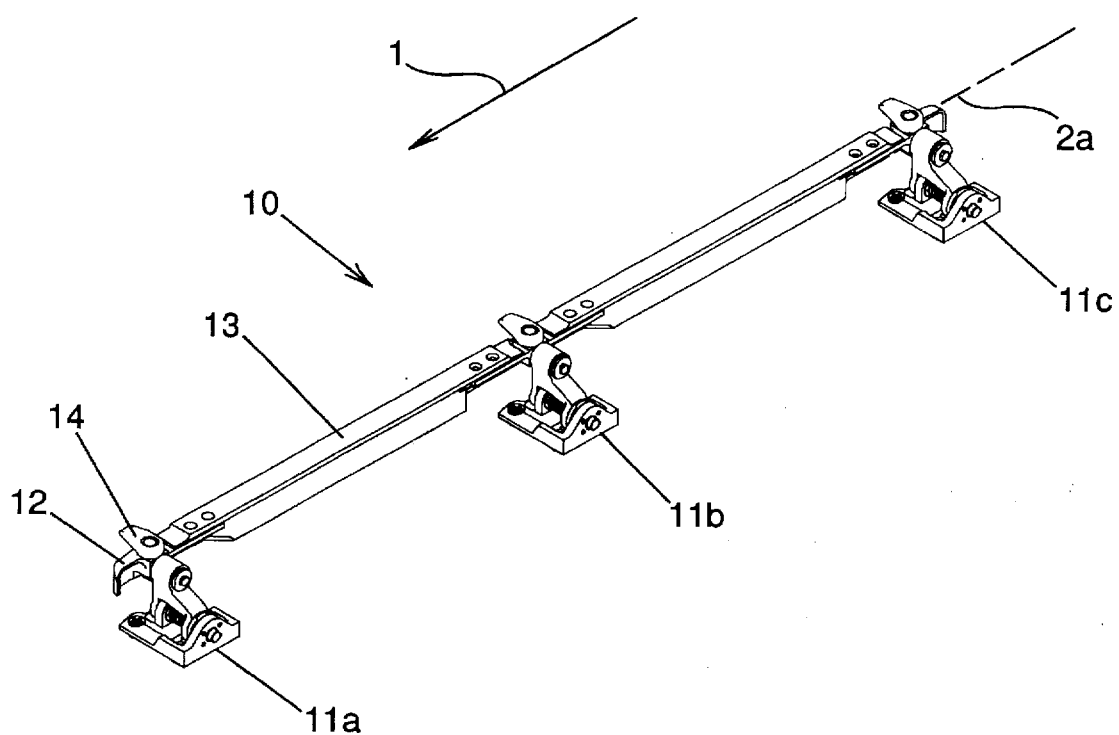
FIG. 1 illustrates a perspective view of a guide rail and support assembly according to the invention in the upward or extended position.

Referring now to the drawing, wherein like reference characters designate like parts and elements throughout the several figures, there is shown in FIG. 1 a guide rail and support assembly 10 shown with its longitudinal axis 2a parallel with the preferred direction of cargo container movement 1. Guide rail and support assembly 10 is comprised of a plurality of retracting rail supports 11a, 11b, and 11c. Of course, any number of retracting rail supports could be used, depending upon the desired length of guide rail and support assembly 10. Linking adjacent retracting rail supports 11a, 11b and 11c is guide rail 13.

Guide rail and support assembly 10 typically has a rail end fitting 12 at each end to serve as a bumper to absorb impact from collisions with cargo containers, and to regain guidance of cargo containers as the cargo containers pass from one guide rail to the next. Also mounted on guide rail and support assembly 10 is a plurality of vertical restraints 14, one positioned at each retracting rail support position. The function of vertical restraint 14 is to allow cargo containers being transported across the cargo deck surface of an aircraft to pass by vertical restraint 14 in either direction parallel with guide rail 13, but to be restrained from moving in the vertical direction. Vertical restraint 14 engages a recess on the cargo container to restrain it from moving vertically, but does not restrain it from moving horizontally. Vertical restraint 14 pivots in either the clockwise or counterclockwise directions to avoid restraining horizontal movement, and uses a simple mechanism to accomplish this function as is well known in the art.

Figure 2:
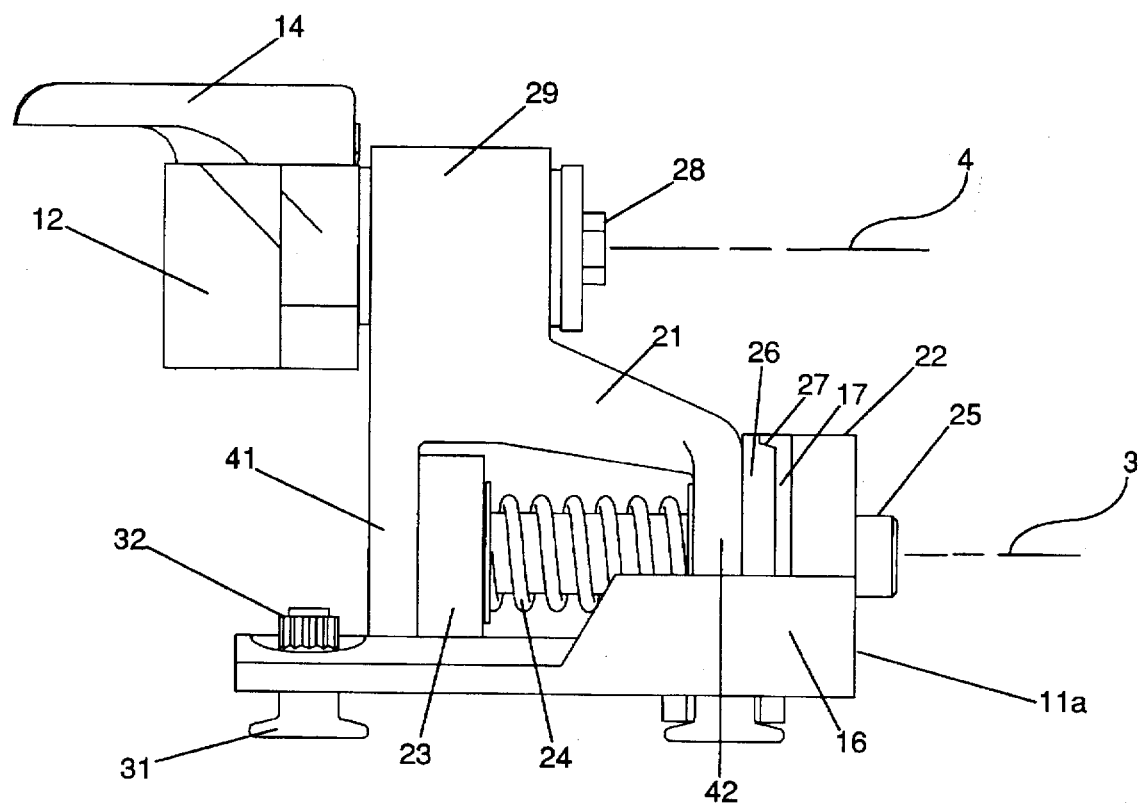
FIG. 2 illustrates a side view of a support base and rotating arm according to the invention.

Referring now to FIG. 2, there is shown in detail a side view of retracting rail support 11a. For purposes of this discussion, the inward direction is defined to be to the left, and outward is to the right, in FIG. 2. Support base 16 includes inner base pivot lug 23 and outer base pivot lug 22, each being penetrated by a cylindrical hole aligned with rotating arm axis 3. Rotating arm 21 similarly has rotating arm inner pivot lug 41 and rotating arm outer pivot lug 42, each having cylindrical holes aligned with rotating arm axis 3. Pivot shaft 25 is assembled coaxially with rotating arm axis 3 and penetrates rotating arm inner pivot lug 41, inner base pivot lug 23, rotating arm outer pivot lug 42, and outer base pivot lug 22. Pivot shaft 25 aligns these members and enables rotation of rotating arm 21 about rotating arm axis 3. Pivot shaft 25 is captured by a C-clip arrangement 48 to rotating arm inner pivot lug 41. Compression coil spring 24 bears against the inner surface of rotating arm outer pivot lug 42 and the outer surface of inner base pivot lug 23 to urge the outer surface of rotating arm outer pivot lug 42 toward the inner surface of outer base pivot lug 22.

Rigidly attached to the outer surface of rotating arm outer pivot lug 42 is detent receptacle member 26. Such rigid attachment is usually accomplished utilizing rivets 61, but could be achieved using other fastening means such as bolts, welding, adhesives or other conventional attachment techniques. Similarly, rigidly connected to the inner surface of outer base pivot lug 22 is detent projection member 17.

Figure 6:
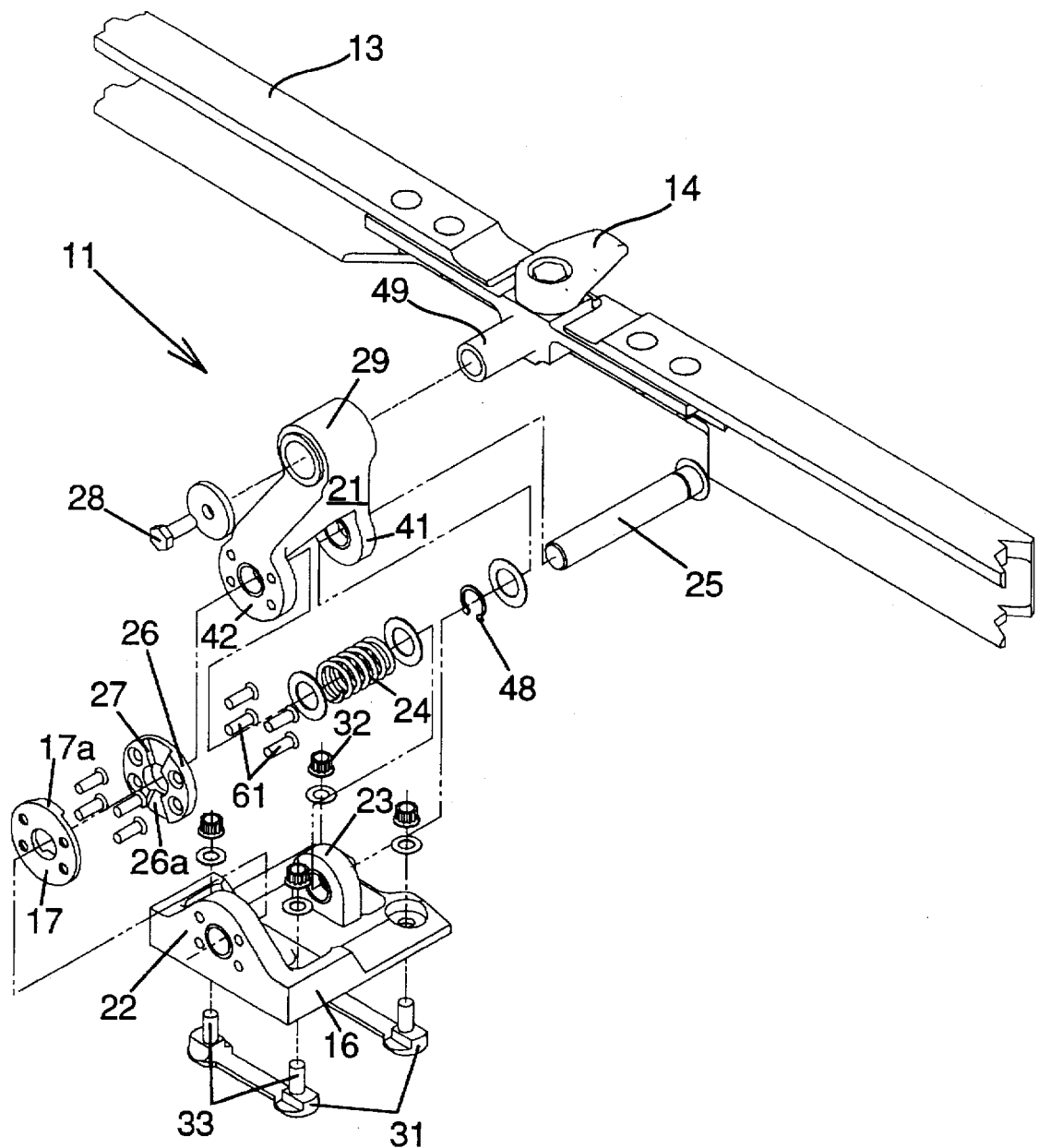
FIG. 6 illustrates a perspective exploded view of the component parts of a guide rail and support assembly including the guide rail, the base and the rotating arm, according to the invention.

Detent projection member 17 defines a pair of raised keys 17a disposed as shown in FIG. 6 at opposite positions on the circumference of detent projection member 17. These raised keys 17a are cooperatively received within a corresponding pair of recesses 26a in detent receptacle member 26 and held there by force from compression coil spring 24. The sides of each raised key 17a and the sides of each recess 26a are cooperatively tapered to provide camming surfaces 27 between detent projection member 17 and detent receptacle member 26. These camming surfaces 27 enable and facilitate detent receptacle member 26 rotating and translating axially inward relative to detent projection member 17, moving inwardly along rotating arm axis 3 against the force from compression coil spring 24 when rotating arm 21 is subjected to sufficient torque. Since both sides of each raised key 17a and recess 26a have a camming surface 27, rotating arm 21 can be released from the detent by sufficient torque in either the clockwise or counterclockwise directions.

Rail end fitting 12 and guide rail 13 as an assembled unit are engaged to rotating arm 21 on retracting rail support 11a by a projecting pin 49 which carries loads transmitted by guide rail 13 to rotating arm 21, and this connection is held together by rail pivot bolt 28. Rotating arm upper pivot 29 rotates around projecting pin 49 and rail pivot bolt 28 as rotating arm 21 moves between the extended or upright position and the lowered or retracted position. Rail pivot bolt 28 and projecting pin 49 are aligned coaxially with guide rail pivoting axis 4 and parallel with rotating arm axis 3.

Figure 3:
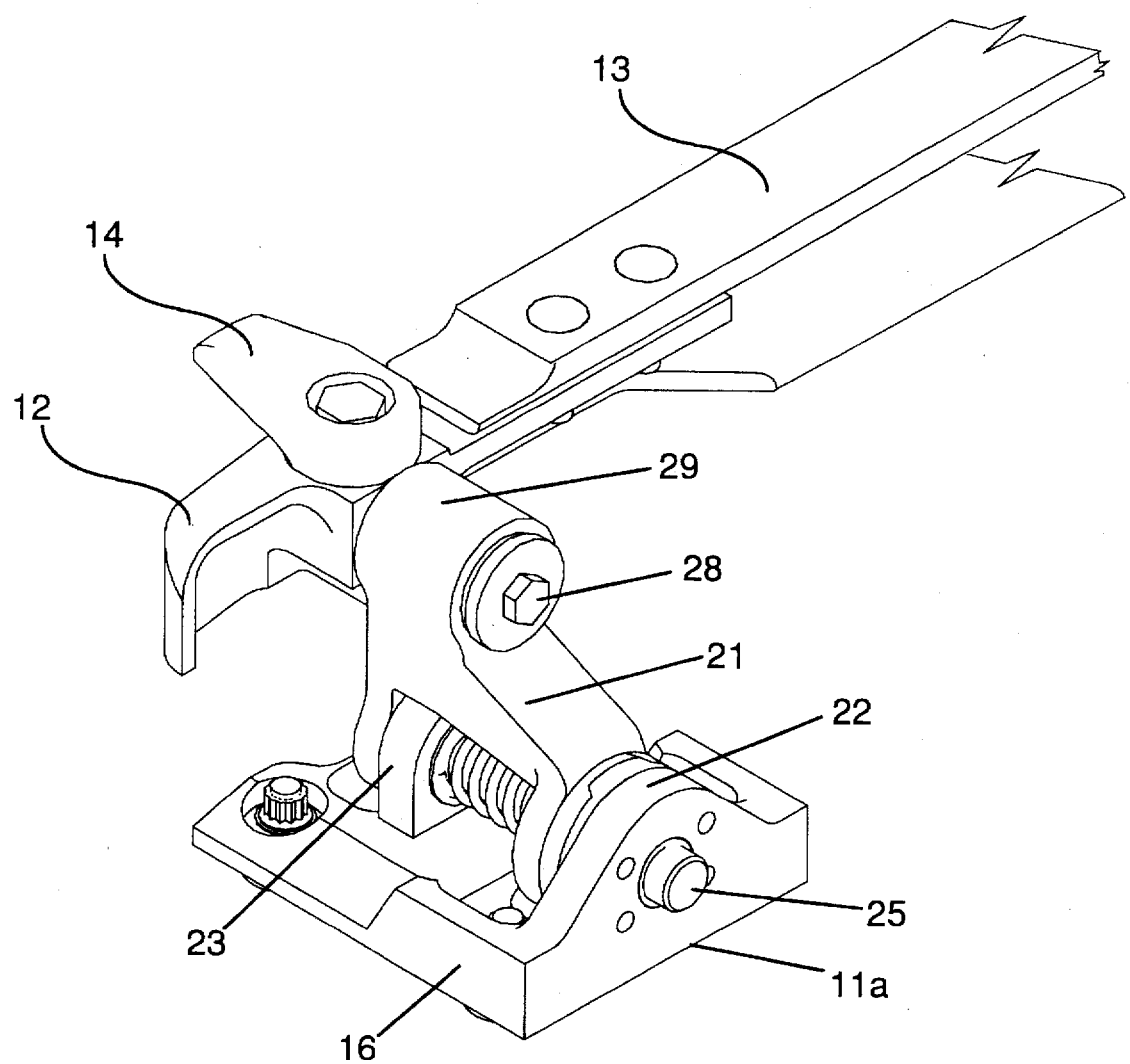
FIG. 3 illustrates a perspective view of a support base and rotating arm according to the invention.
Figure 4:
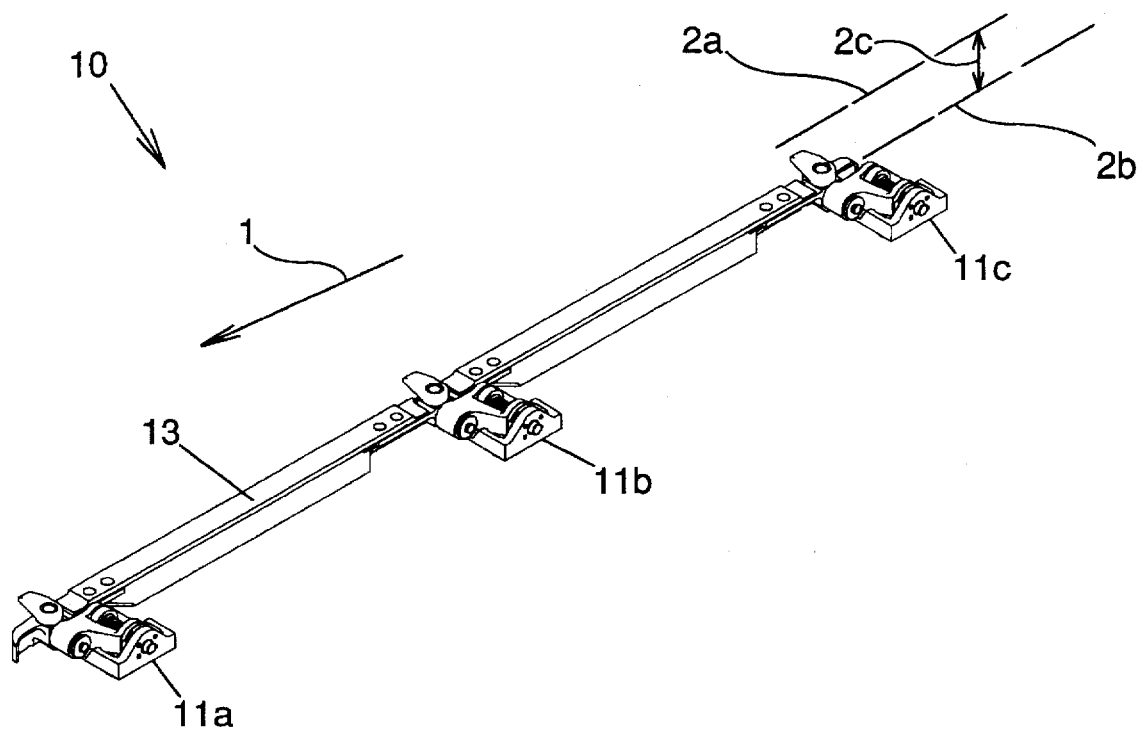
FIG. 4 illustrates a perspective view of a guide rail and support assembly according to the invention in the lowered or retracted position.
Figure 5:
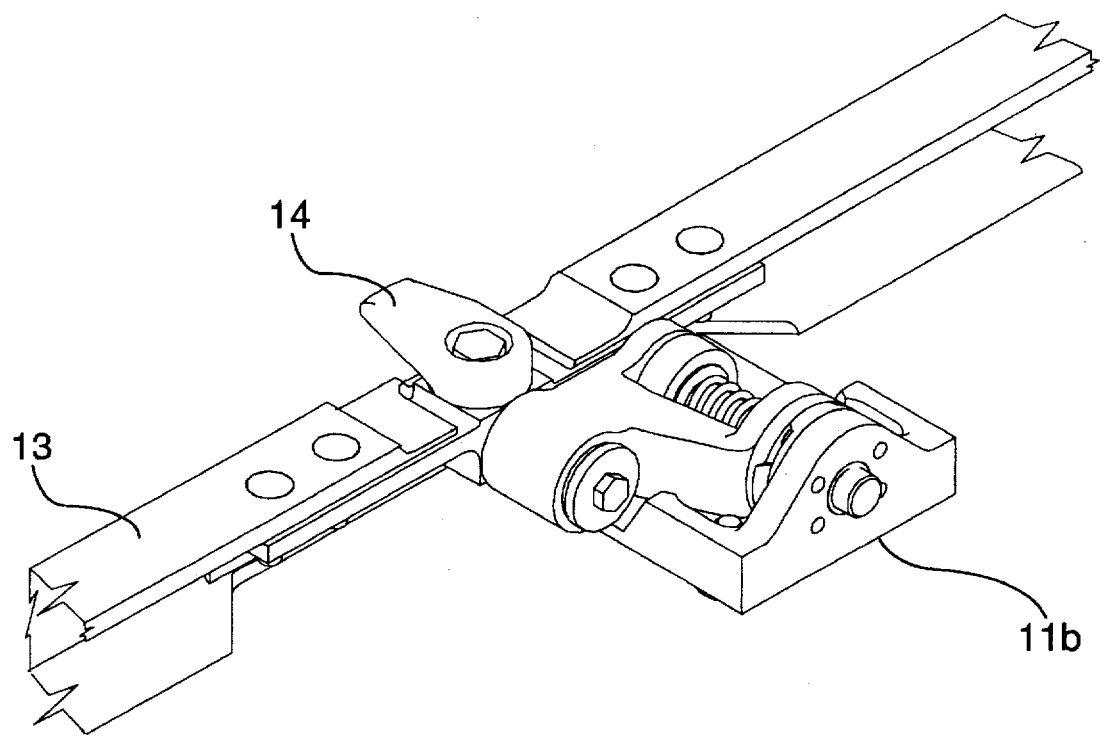
FIG. 5 illustrates a detailed perspective view of a support member according to the invention in the lowered or retracted position.

Referring now to FIGS. 1, 3 and 6, force applied to rail end fitting 12 along preferred direction of cargo container movement 1 is transmitted through projecting pin 49 and rail pivot bolt 28 to the area of rotating arm upper pivot 29, the transmitted force being directed parallel with guide rail longitudinal axis 2a. This transmitted force applies torque to rotating arm 21. Detent receptacle 26, being rigidly attached to rotating arm 21 at rotating arm outer pivot lug 42, then rotates about pivot shaft 25 and slides along camming surfaces 27 translating inward along pivot shaft 25 against the urging of compression coil spring 24. When detent receptacle 26 has climbed camming surface 27 and escaped detent projection 17, rotating arm 21 is then free to rotate in the direction of the applied force, thereby lowering rotating arm upper pivot 29 from its upright position to a retracted position close to or below the cargo compartment deck surface. FIG. 4 illustrates guide rail and support assembly 10 in the lowered or retracted position where guide rail longitudinal axis 2b has moved to a position lower than guide rail longitudinal axis 2a corresponding to the extended or upright position as shown by reference arrow 2c. FIG. 5 shows in greater detail retracting support 11b in the retracted or lowered position.

As best shown in FIG. 6, retracting rail support 11 is secured to the cargo deck surface by specialized fasteners. Aircraft cargo deck surfaces typically include short equipment attachment channels having greater width near the bottom of the channel than at the top. These channels accept specialized fasteners similar to the T-bolts commonly used to secure work pieces to machining tables during machine shop operations. An anchor foot 31 having a base broader than its shank width is inserted into such a cargo deck surface equipment attachment channel at an enlarged entry point and then moved longitudinally along the channel to engage the channel sides. Such short equipment attachment channels define the position of each support member so that installation of guide rail and support assembly 10 is simplified.

Anchor foot 31 includes two threaded shanks 33 that project upwardly and penetrate holes in support base 16. Fasteners 32, typically threaded nuts, are then threaded upon the threaded shanks 33 of anchor foot 31 and tightened to secure support base 16 to the cargo deck surface. Usually, two such anchor feet 31 and four fasteners 32 are used to secure a single retracting rail support 11, but of course the number and location of fasteners depends upon the available space and strength requirements of a particular application.

In operation, when secured to a cargo deck surface, a guide rail and support assembly 10 in the upright or extended position provides a guide rail surface for cargo containers being transported by a powered cargo container transport system. Such cargo containers are guided by glancing contact with guide rail 13. Of course, a corresponding guide rail is used on the opposite side of the aircraft cargo deck surface, and respective guide rail pairs are spaced the appropriate distance for the size of cargo container being handled.

In order to handle different sizes of cargo containers at different times, several guide rails may be required in the same general area of the cargo deck surface, thereby requiring that the innermost guide rail and support assemblies be retractable or collapsible to clear the way when wider containers are being handled. If the guide rail assembly incorporates a collapsing mechanism which pivots about an axis parallel with the guide rail longitudinal axis, then the guide rail assembly is vulnerable if it is accidentally left in the extended position while a cargo container of wider dimension is transported and collides with the rail end fitting 12. In this situation the anchor feet 31 will transmit the force of impact and may cause damage to the cargo compartment deck surface and the deck channels in which the anchor feet 31 are secured.

To avoid this result, the present invention rotates about rotating arm axis 3 and guide rail pivoting axis 4 which are each parallel to each other and parallel to the cargo deck surface, but are perpendicular to the guide rail longitudinal axis 2a. In this way, impact to rail end fitting 12 in the preferred direction of cargo container movement 1 causes release of detent projection 17 from detent receptacle 26 to enable rotation of rotating arm 21 about rotating arm axis 3 and guide rail rotation about rail pivot bolt 28 at rotating arm upper pivot 29. This relative rotational movement causes guide rail 13 to translate from the upper or extended position to the lower or retracted position, all the while longitudinal axis 2a remaining parallel with the cargo deck surface as it translates to guide rail axis position 2b. In this lowered or retracted position, the guide rail end bumper has lowered into a recess in the floor and is no longer in the path of a cargo container. Further, in the process of detent projection member 17 escaping detent receptacle member 26, energy from the cargo container collision is absorbed in friction and in compressing compression coil spring 24.

Other improvements, modifications and embodiments will become apparent to one of ordinary skill in the art upon review of this disclosure. Such improvements, modifications and embodiments are considered to be within the scope of this invention as defined by the following claims.

What is claimed is:

1. A guide rail and support assembly apparatus for attachment to a surface for use in guiding cargo containers along said surface in a predetermined direction and protecting said surface from damage caused by moving cargo containers striking the end of said guide rail and support assembly apparatus, said apparatus comprising:

a guide rail having a longitudinal axis and defining a limit of cargo container movement across said surface;

a plurality of support members, each having a base portion and an arm portion attached to said base portion for pivotal movement through a range of angular positions about a first axis;

the arm portion of each, said support member being connected to said guide rail for pivotal movement about a second axis that is parallel with and spaced from said first axis and perpendicular to said guide rail longitudinal axis;

fastener means for rigidly connecting each said base portion to the surface in a position aligning said guide rail longitudinal axis parallel with said predetermined direction, and said first and second axes both parallel with said surface; and a detent mechanism operative to retain said arm portion in an extended position relative to said base portion, said detent mechanism being releasable at a predetermined force magnitude to allow said arm portion to pivot relative to said base portion to a retracted position.

2. A guide rail and support assembly apparatus as set forth in claim 1, wherein, each said support member further comprises:

said base portion having first and second shaft supporting lug members, each shaft supporting lug member defining a hole;

said arm portion having first and second lugs, each lug defining a hole;

an aligning shaft penetrating said holes in said first and second shaft supporting lug members of said base portion and said holes in said first and second lugs of said arm portion for maintaining predetermined alignment of said base portion and said portion, while enabling rotation of said arm portion relative to said base portion; and a resilient member bearing against an outer surface of said first shaft supporting lug member on said base portion, and against an inner surface of said second lug on said arm portion, operative to urge an outer surface of said second lug of said arm portion toward an inner surface of said second shaft supporting member of said base portion.

3. A guide rail and support assembly apparatus as set forth in claim 2, wherein said resilient member comprises a compression coil spring.

4. A guide rail and support assembly apparatus as set forth in claim 2, wherein said detent mechanism further comprises:

at least one raised key attached to said inner surface of said second shaft supporting lug member of said base portion, and at least one cooperative recess attached to said outer surface of said second lug of said arm portion, operative to receive said at least one raised key corresponding to said arm portion being rotated to said extended position.

5. A guide rail and support assembly apparatus as set forth in claim 4, wherein said detent mechanism further comprises:

said at least one raised key having tapered sides; and said of least one recess having tapered sides corresponding to the tapered sides of said at least one raised key for providing an inclined ramp surface for facilitating rotational release of said arm portion relative to said base portion in response to an applied force having greater than a predetermined magnitude and aligned in a predetermined direction.

6. A guide rail and support member apparatus for use in guiding cargo containers along an aircraft cargo deck surface in a predetermined direction and protecting said surface from damage caused by moving cargo containers striking the end of said guide rail and support member apparatus, said apparatus comprising:

a guide rail having a longitudinal axis and defining a limit of cargo container movement across said surface;

a plurality of support members, each having a base portion and an arm portion attached to said base portion for pivotal movement through a range of angular positions about a first axis;

the arm portion of each said support member being connected to said guide rail for pivotal movement about a second axis that is parallel with and spaced from said first axis and perpendicular to said guide rail longitudinal axis;

fastener means for rigidly connecting each said base portion to the cargo deck surface and aligning said guide rail longitudinal axis parallel with said predetermined direction, each said support member being attached in a position having the relative angular position of each said arm portion relative to its respective said base portion being the same, and said first and second axes both parallel with said surface; and a detent mechanism operative to retain said arm portion in an upright position relative to said base portion, said detent mechanism being releasable at a predetermined force magnitude to allow said arm portion to pivot relative to said base portion to a reacted position.

7. A guide rail and support assembly apparatus for attachment to an aircraft cargo compartment surface for use in guiding cargo containers along said surface in a predetermined direction and protecting said surface from damage caused by moving cargo containers striking the end of said guide rail and support assembly apparatus, said apparatus comprising:

a guide rail having a longitudinal axis and defining a limit of cargo container movement across said surface;

a plurality of support members, each having a base portion and an arm portion attached to said base portion for pivotal movement through a range of angular positions about a first axis;

the arm portion of each said support member being connected to said guide rail for pivotal movement about a second axis that is parallel with and spaced from said first axis and perpendicular to said guide rail longitudinal axis;

fastener means for rigidly connecting each said, base portion to the cargo compartment surface in a position aligning said guide rail longitudinal axis parallel with said predetermined direction, and said first and second axes both parallel with said surface; and a detent mechanism operative to retain said arm portion in an extended position relative to said base portion, said detent mechanism being releasable at a predetermined force magnitude to allow said arm portion to pivot relative to said base portion to a retracted position.

* * * * *